United States Patent [19]

Chambers et al.

[11] Patent Number: 4,547,386
[45] Date of Patent: Oct. 15, 1985

[54] LACTOSE/CHEESE WHEY/WHEY FILTRATE SEMI-SOLID ANIMAL FEED SUPPLEMENT

[75] Inventors: James V. Chambers, Lafayette; T. Wayne Perry, West Lafayette, both of Ind.; Dennis A. Lonergan, Oakdale, Minn.; Jay S. Marks, Battle Ground, Ind.

[73] Assignee: Purdue Research Foundation, West Lafayette, Ind.

[21] Appl. No.: 583,958

[22] Filed: Feb. 27, 1984

[51] Int. Cl.$^4$ ............................................... A23K 1/08
[52] U.S. Cl. ...................................... 426/583; 426/74; 426/465; 426/512; 426/520; 426/658; 426/807
[58] Field of Search ............... 426/465, 583, 658, 2, 426/623, 630, 636, 807, 573, 69, 334, 74, 512, 520

[56] References Cited

U.S. PATENT DOCUMENTS

| | | | |
|---|---|---|---|
| 3,246,336 | 4/1966 | Baribo et al. | 426/2 |
| 3,476,565 | 11/1969 | Carlton et al. | 426/807 X |
| 3,532,503 | 10/1970 | Kviesitis | 426/807 X |
| 3,669,676 | 6/1972 | Karr | 426/807 X |
| 4,160,041 | 7/1979 | Schroeder et al. | 426/334 X |
| 4,234,608 | 11/1980 | Linehan | 426/72 |
| 4,333,956 | 6/1982 | Juengst et al. | 426/69 |

OTHER PUBLICATIONS

Webb, "Byproducts from Milk", Avi Publishing Co, 1970, p. 327.

*Primary Examiner*—R. B. Penland
*Attorney, Agent, or Firm*—Barnes & Thornburg

[57] ABSTRACT

A process is disclosed for forming an animal feed block from whey. By-product whey is concentrated to form a whey concentrate having a solids content of at least about 45%. A divalent cation containing material, such as calcium phosphate, is added to the concentrate. The pH of the concentrate is then adjusted to between about 4.0 and about 6.0, and preferably between about 4.6 and about 5.0. The concentrate can then be poured into a mold, such as a cardboard box. The concentrate is dried to form a feed block having a water content of less than about 32%. Additionally, a whey feed block is disclosed which is produced by the above-described process.

19 Claims, 3 Drawing Figures

LACTOSE/CHEESE WHEY/WHEY FILTRATE SEMI-SOLID ANIMAL FEED SUPPLEMENT

FIELD OF THE INVENTION

This invention relates to a process for manufacturing a semi-solid animal feed, and more particularly to a process for fabricating feed supplement blocks for animals using concentrated lactose, cheese whey and whey filtrate/permeate derived from ultrafiltration or combinations thereof as a formulation base.

BRIEF DESCRIPTION OF THE PRIOR ART

The process of the instant invention is directed to enabling cheese manufacturers and other processors of whey to utilize their by-products to produce a marketable end product, a semi-solid animal feed block for use as a feed supplement for animals. The feed block of the instant invention has both economic and functional benefits. An economic benefit comes from the elimination of the spray drying and bagging operations required by prior art whey processing techniques which are labor- and energy-intensive. A functional benefit of the semi-solid animal feed block is derived from the versatility of its applications. These applications are therapeutic and nutritional in nature, as both nutrients (in addition to the whey) and medicaments can be incorporated into the feed block. The semi-solid block permits a dosage delivery system for these applications under free choice feeding conditions.

In the prior art, a key ingredient to most solid animal feed supplement blocks is the syrup form of cane, beet and corn sugars. For example, the sugar sources described in U.S. Pat. No. 4,160,041 include sucrose, glucose, lactose, maltose or fructose at ranges between 15 and 93%. However, much of the focus of the '041 patent is on cane, blackstrap molasses, beet molasses, converted molasses, wood sugar molasses, hydro syrup and citrus molasses concentrated to a Brix value between 65 and 85. When lactose from whey is used, emphasis is placed only on the solublized form of lactose, and preferably hydrolyzed lactose. Lactose is a twelve carbon containing disaccharide formed by the union of a molecule of D(+) glucose and a molecule of D(+) galactose. When hydrolyzed, lactose splits into its six carbon containing, soluble sugar components, glucose and galactose, and hence does not remain in its disaccharide form as lactose.

As with the above described '041 patent, U.S. Pat. No. 4,234,608 describes the use of the sugars of molasses and whey for the production of an alkaline feed block. The process described in '608 is very similar to that described in '041, insofar as '608 describes a fabrication process which involves the ultimate complexing of the soluble form of the sugar with calcium or magnesium and phosphate or sulfate. The final complex is a structurally stable material.

Another prior art reference, U.S. Pat. No. 4,333,956, records the preparation of a solid animal feed block by mixing a fermented ammoniated condensed whey with calcium chloride, calcium sulfate, or calcium phosphate. In the process disclosed in '956, the lactose is conditioned by the presence of ammonia which readily complexes with the soluble calcium salts to form a hardened block when cooled.

Common to the above known processes is the use of a soluble sugar, and a multivalent cation bridged to a phosphate or sulfate ion to form complexes in the ultimate solid block. In contrast, the instant invention takes advantage of the crystallized form of lactose under saturated conditions and in the presence of water binding materials to form the semi-solid animal feed supplement.

Hargrove and Lynch have reported a fabrication process which utilized whey solids which were concentrated to a 65 to 70% solid level. These researchers reported their work in, *Solid Animal Feeds from Whey and Whey Products,* PROCEEDINGS OF THE WHEY PRODUCTS CONFERENCE, E.R.R.C. Publi. No. 3996 (1974). The Hargrove and Lynch process requires a 65 to 70% whey solids base which is neutralized to between pH 6.0 and 6.5, after which the whey solidifies, upon cooling, into a block form. The procedure is further discussed in Hargrove, McDonough, and Lynch, *Whey Fraction Converted Into Animal Feed Without Drying,* FOOD ENGINEERING (February 1974), p. 77.

Lynch and McDonough, *U.S.D.A. Research on Whey and Whey Products as Feed for Cattle,* 72 J. FOOD CHEM. 695 (1979) discloses the results of feeding liquid whey and whey feed blocks to cattle. Lynch and McDonough prepared their feed blocks according to the process outlined in Hargrove and Lynch (1974), supra.

The high level of whey solids required for the Hargrove and Lynch fabrication process presents a very difficult condition to achieve efficiently with vacuum evaporators. Also, the whey mixture formed by the Hargrove and Lynch process is not thixotropic. Therefore, should there be an evaporator failure, the high solids (65 to 70%) would harden within the equipment due to cooling and would require physical removal.

Another feed block manufacturing process, not employing whey, is described in Wright et al U.S. Pat. No. 4,349,578. Wright uses soybean meal to bind feed constitutents together to form a feed block.

The present invention improves upon the known methods of forming feed blocks. The process of the present invention starts with concentrated whey having a solids content of greater than about 45%, and generally in the range of 50 to 55%. This approximates the level to which whey is usually concentrated by vacuum evaporators prior to spray drying. To produce the feed blocks, the concentrated whey is permitted to develop lactose crystals. Various feed supplements and additives (processing aids) are then added to the concentrated whey while being heated (60°–70° C.), and the resulting mixture is pumped into forms. The whey feed blocks are then air dried between 20° C. and 40° C. eliminating the energy, capital, and labor expense of spray drying and bagging. The fabrication process of the instant invention seeks to maximize the crystallization properties of lactose, and to use these properties to their best advantage to form a semi-solid block which may have multiple applications.

BRIEF STATEMENT OF THE INVENTION

The invention comprises a process for forming whey feed blocks, and the feed blocks formed thereby. The process comprises the steps of concentrating the soluble lactose and crystallized lactose components of whey to form a whey admixture having a solids content of at least about 45%. A divalent cation containing compound, selected from the group consisting of sulfate and phosphate salts, is added to the admixture. The pH of the admixture is adjusted to between about 4.0 and 6.0.

The admixture is dried to form a feed block having a water content of less than about 32%.

Illustratively, sodium cloride can be added to the admixture to achieve between about a 4% and a 12% concentration in the feed block. Additionally, a hydrocolloid stabilizer, such as xanthan gum or locust bean gum can be added to the admixture.

DESCRIPTION OF THE DRAWINGS

The description of preferred embodiments particularly refers to the accompanying drawings in which.

DESCRIPTION OF PREFERRED EMBODIMENTS

Figure 1:
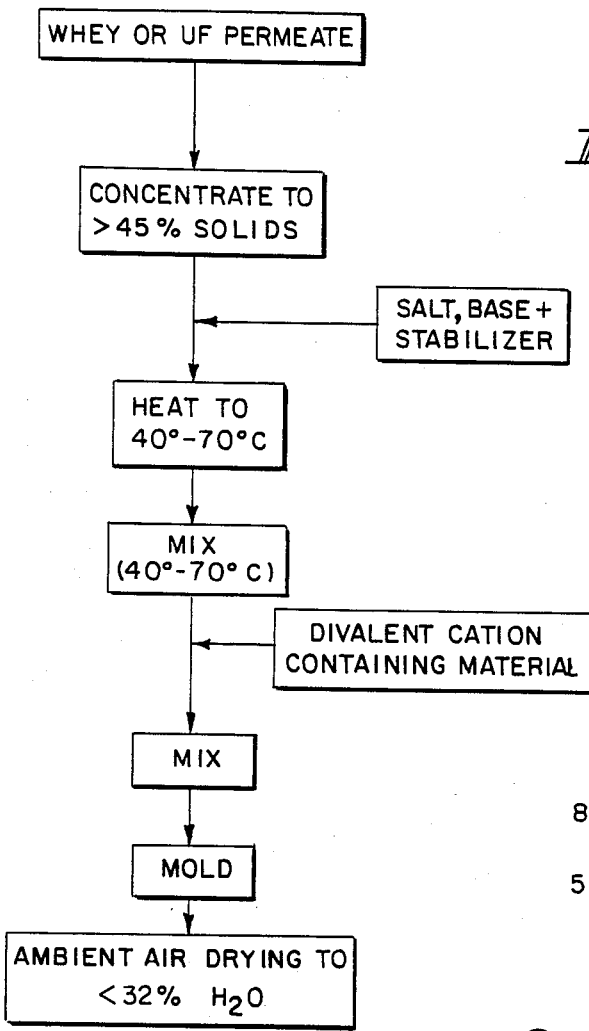
FIG. 1 is a block diagram illustrating the instant process for producing a whey feed block.
Figure 3:
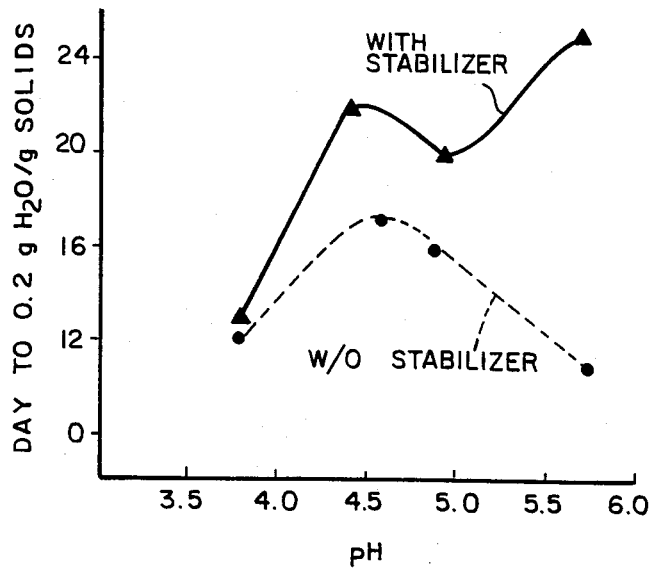
FIG. 3 is a graph illustrating the drying time of the feed block as a function of the pH of the feed block both with and without stabilizers.

Referring now to FIG. 1, a process is illustrated for the facile preparation of a semi-solid animal feed supplement utilizing the crystalline properties of lactose under saturated conditions and in the presence of water binding materials. An example of a common water binding material is a mixture of hydrocolloid stabilizers. The semi-solid animal feed supplement is typically prepared from a concentrated (45 to 55% solids) whey or whey permeate base to which sodium chloride, sodium or potassium hydroxide, stabilizer mixture, the functional supplement, and dicalcium phosphate are added. Due to the acidic influence of the dicalcium phosphate in the presence of free water, the sodium or potassium hydroxide is used to control the final pH of the final admixture at between about 4.0 and 6.0, and preferably between 4.6 and 5.0. The final pH influences the viscosity of the admixture. Mixing of the ingredients takes place at a temperature of greater than about 40° C., and preferably in the range between 60°–70° C. The use of the hydrocolloid stablizer mixture produces a thixotropic blend which is a desired process feature. The final admixture is cooled to below about 40° C. and dispensed into paperboard cartons. These cartons are stored at ambient temperatures between 20° C.–40° C. and preferably between 20° C.–30° C., at a relative humidity below 70% and in a location with sufficient air movement to permit 1 room air change per hour. The blocks are firm for handling within a 10–14 day time period, usually having a moisture content of 25–30%.

Formulation adjustments are needed to accommodate the hygroscopic and pH influences of the functional feed additives. One example of a functional feed additive which may require a formulation adjustment is urea, which can be used in the feed block as a protein supplement for ruminant animals. Although urea is a good nonprotein nitrogen additive, it is very hygroscopic. Hence, divalent cation sources and lactose solids are needed to compensate for the water-holding capacity of the urea. In the case of mineral supplement application, the lactose content may be adjusted to improve palatability and firmness of the semi-solid feed block. Where mineral salts influence the alkalinity or acidity of this block, pH adjustment to the desired range (4.6 to 5.0) is needed. For medicated supplements that impart tastes objectionable to the animal, the sodium chloride and/or lactose content can be regulated to improve acceptability by the consuming animal.

Figure 2:
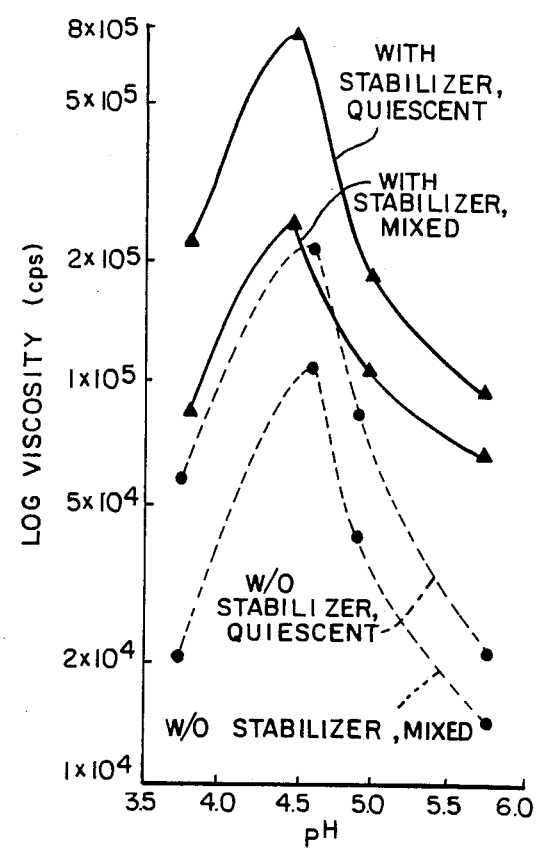
FIG. 2 is a graph illustrating the viscosity of the whey mixture produced according to the instant invention as a function of the pH of the mixture for both quiescent and mixed samples.

The method of this instant invention provides an improved manufacture of a semi-solid feed supplement using the combined physiochemical properties of lactose and the hydrocolloidal type stabilizers, as shown in FIG. 2. The use of these properties produces an admixture that exhibits a thixotropic behavior which is desirable in a processing and production system. A thixotropic material is one which when a force is applied to it (e.g., by mixing), demonstrates liquid flow characteristics. However, when the material is left in a quiescent state, it becomes semi-solid (gel-like) in consistency.

Alternatives to hydrocolloidal stabilizers as water binding agents are soy meal, dried whey powder or lactose, powdered divalent cationic containing salts associated with phosphate or sulfate, and short (1 inch cut) chopped dried haylage such as alfalfa and pasture grasses.

The manufacturing method illustrated diagrammatically in FIG. 1 requires that an aqueous medium containing lactose, or whey or whey filtrate, or combinations thereof, possess partially crystallized lactose and have a total solids concentration of at least 45%, and preferably between about 50 and 55%, and be heated to at least about 40° C., and preferably to 60°–70° C. Sodium chloride, which regulates consumption rates and serves as a mold inhibitor, is added to the lactose-containing admixture to achieve a concentration level greater than about 4%, and preferably in the range of 5 to 10% in the finished feed block. The functional feed additive is blended into this admixture at the solids concentration needed to meet the dosage requirements of the semi-solid feed block and at the desired consumption rates. This is followed by the addition of the selected water-binding material which influences the lactose crystal formation, under saturated conditions. Normally, this material would be a blend of hydrocolloidal stabilizers which include, but are not limited to, locust bean gum and xanthan gum. A sufficient quantity of sodium or potassium hydroxide, in pellet form, is added to the admixture to compensate for the acidic effect of the dicalcium phosphate or other selected divalent cationic salt source to attain in pH value between 4.0 to 6.0, and preferably between 4.6 and 5.0. Deviations in pH of this admixture on the acidic side of 4.0 will weaken the structure of the semi-solid block, while pH values above 6.0 increase the water binding property of the block constitutents. An increase in water binding results in a very soggy, slurry-like block. Therefore, pH control is important in influencing the freshly processed admixtures' viscosity. Additionally, the pH affects the admixture's water retention properties during its drying period. The influence of pH on viscosity is illustrated in FIG. 2.

Following the addition of the sodium or potassium hydroxide pellets, the divalent cationic salt is added to the admixture, blended and the final pH is ascertained. The admixture is cooled to below about 40° C. and dispensed into paperboard cartons which serve as molds for this feed supplement material.

The paperboard molds containing the feed supplement admixture are transferred to an appropriate storage area for drying. Drying conditions should be: (1) 20° to 40° C. temperature range; (2) relative humidity below 70%; and (3) air movement that permits one room volume change in an hour. Under these conditions, the finished semi-solid feed supplement should be ready for handling after 10 to 14 days storage.

Table 1 sets forth the proportions of the constituents in the composition of sweet cheese whey:

TABLE 1

Composition of concentrated (40 to 55% total solids) Sweet Cheese Whey

| Constituent | % Wet Wt. Basis |
| --- | --- |
| Lactose | 32–40 |
| Protein | 5–8 |
| Fat | 0.1–5 |
| Ash | 3.5–8 |
| Moisture | 45–60 |

Table 2 sets forth proportions of ingredients in a feed block of the instant invention when concentrated lactose, cheese whey (such as that set forth in Table 1), whey permeate, or combinations thereof, are used as the formulation base.

TABLE 2

Approximate Proportions of the Ingredients in the Composition of the Instant Invention[1]

| Component | Ingredient Range | Optimal Variation |
| --- | --- | --- |
| Lactose | 40 to 60% | 49 to 55% |
| Stabilizer or Alternative | 0.3 to 1.0% | 0.5 to 0.65% |
| Divalent Cationic Salt | 10 to 20% | 12 to 16% |
| Functional ingredient | Added according to desired dosage concentration; usually represents up to 10% of formulation | |
| Sodium Chloride | 5 to 12% | 5 to 10% |
| Sodium hydroxide or Potassium hydroxide[2] | 0.8 to 1.7% | 1 to 1.4% |
| Moisture/water | 25 to 32% | 25 to 28% |

[1]Values expressed on dry weight basis percentage.
[2]Amount determined by quantity and type of divalent cationic salt used. Final pH of final admixture should be between 4.6 and 5.0.

The Lactose Source

Cheese whey utilization or disposal continues to be a major problem area that confronts the processing segment of the dairy industry. Present methods being employed for transforming whey into a marketable form are limited in end product flexibility, and require large process volumes of whey to operate economically. Additionally, presently used process systems for carrying out known processes are very costly to set up. Most process systems are one- or two-step operations and, thus, the major portions of whey used for food formulation receive a minimal amount of processing (e.g., direct spray drying, lactose crystallization, or whey blends with dried skim milk powder). Currently, the more steps that are introduced into a system for processing whey, the higher the cost of processing the whey and consequently, the higher the cost of the end products(s). Therefore, it seems appropriate and necessary that a system be devised, such as the instant invention, that will require a minimal amount of capital expenditure, will utilize energy efficiently and be adaptable to a variety of dairy plant operating requirements or situations. An additional benefit of the instant invention is the ability of the process to be integrated into dairy plant operating requirements or situations to provide better quality by-products and to utilize the functional properties of these by-products in animal feed applications. Essentially, whey is still an "untapped" food source which, at present, is a liability to the dairy industry in terms of enviromental pollution, disposal and low market value in the processed dehydrated form.

Of the 3.5 billion pounds of cheese whey produced per year, approximately 1.9 billion pounds of this cheese by-product are either environmentally disposed of or used for animal feed (i.e. hogs, veal calves). With tighter restrictions on whey disposal, and with few viable options for whey utilization, many cheese plant operations are facing a disposal/utilization dilemma. Thus, whey disposal represents a liability and an expense to cheese plant operators. The instant invention ties in with state-of-the-art practices for concentrating whey, manufacturing lactose, and whey protein recovery processes (e.g. ultrafiltration).

To facilitate the best performance in forming the semi-solid feed supplement, it is necessary to crystallize the lactose in the concentrate (45 to 55%) partially. Commonly this is done by holding the whey/lactose-containing medium in its condensed form overnight, for about 12 to 16 hours at 10° C. The partially condensed lactose-containing medium is ready for use as the formulation base in the manufacture of the semi-solid feed block.

The Divalent Cationic Salt

The divalent cationic salts in order of preference are dicalcium phosphate, monocalcium phosphate, calcium sulfate, magnesium phosphate and magnesium sulfate. These salts aid in strengthening the gel structure of the semi-solid feed supplement. These salts also have nutritional benefits to the consuming animal.

Functional Feed Supplements

Feed conversion enhancers such as Rumensin ® (monensin) produced by Eli Lilly and Co., vitamins, selected minerals, assorted protein-nonprotein nitrogen sources and a variety of medicaments can independently be incorporated into the semi-solid feed supplement. These functional feed additives have basic therapeutic and nutritional applications. In some cases, these additives impart tastes objectionable to the consuming animal. These objectional tastes are overcome or masked by the presence of lactose and sodium chloride.

In addition to its function of masking objectionable tastes, the sodium chloride concentration is used to regulate the feed supplement consumption rate. It has been found that, generally, cattle prefer a feed block which has a salt content of approximately 8% (on a dry weight basis). The manufacturer and/or cattle grower may decide to use a salt concentration of more or less than 8% to discourage overconsumption of the feed block and to encourage the animal to supplement its diet with grasses or other materials. For example, it has been found that a salt content of approximately 9% to 12% provides a feed block which, although palatable to the animal, will cause the animal to supplement its diet with food other than that provided by the feed block.

The process of the instant invention facilitates the addition of biologically active supplements, e.g., microorganisms, and medicaments, e.g., antibiotics. Because a relatively low heat (60°–70° C.) is used in the fabrication procedure, biologically active supplements and medicaments are less likely to become deactivated or denatured.

Stabilizers

To optimize the desired thixotropic behavior of the lactose-based semi-solid feed supplement admixture, a mixture of stablilzers is preferred. The stabilizers are process aids which bind free water in the admixture and assist in forming the gel-like structures of the present invention. The stabilizers should be of the hydrocolloidal type which include, but are not limited to, locust bean gum and xanthan gum.

Other available water binding aids suitable for use in the fabrication process include ammonium lignin sulfonate, sodium lignin sulfonate, magnesium lignin sulfonate, suitable chopped fibrous materials, such as chopped haylage (i.e. grasses, alfalfa), and soybean meal.

PRACTICE OF THE INVENTION

The following examples illustrate the practice of the instant invention and serve to demonstrate results achieved thereby.

EXAMPLE I

Concentrated whey (50% solids) was heated to 60° C. (135° F.). A mixture of 10 parts by weight sodium chloride and 0.5 part by weight stabilizer was added to 137 parts by weight of the heated whey. The mixture was blended 5 minutes. One part by weight of sodium hydroxide was added, and the mixture was again blended 5 minutes. Twenty parts by weight of calcium phosphate were added, and the mixture was blended 10 minutes. The mixture was then cooled to 40° C. (120° F.) and pumped into boxes. The blocks were air-dried 2 weeks to give a suitable final consistency.

EXAMPLE II

The method of Example I was followed, except that 132 parts of concentrated whey (50% solids) were used. Also, after the calcium phosphate was added, 7.5 parts by weight of urea were added. The mixture was blended until the urea was thoroughly incorporated (about 10 minutes). The mixture was cooled and packed as in Example I.

EXAMPLE III

The method of Example II was followed, except that the urea in Example II was replaced with 4.5 parts by weight of urea plus 17 parts by weight of soy meal (42% protein).

EXAMPLE IV

The method of Example I was followed, except that 0.64 parts by weight of Rumensin ® were combined with the sodium chloride and stabilizer.

The preceding examples are set forth as illustrative examples of this invention which have been performed by the inventors. There is no intention limit the invention by these examples.

What is claimed is:

1. A process for forming whey feed blocks consisting essentially of the steps of concentrating whey which has been held for a time sufficient to partially crystallize lactose in the whey to form a whey admixture having a solids content of at least about 45%,
    adding up to 20% by weight of a hydrocolloid stabilizer for binding water in the whey admixture to form a gel-like structure,
    adding from about 10 to about 20% dry weight of a salt selected from the group consisting of phosphate salts of calcium and magnesium to strengthen the gel-like structure of the whey admixture
    adjusting the pH of the admixture to between about 4.0 and about 6.0, and
    drying the admixture to form a feed block having a water content of less that about 32%.

2. The process of claim 1 wherein said whey is a permeate fraction of ultrafiltered whey.

3. The process of claim 1 wherein said whey admixture is concentrated to have a solids content of between about 50% and about 55%.

4. The process of claim 1 further comprising the step of adding sodium chloride to the whey admixture.

5. The process of claim 4 wherein the sodium chloride is added to achieve between about a 4% and a 12% concentration in the feed block to regulate the consumption of the feed block by a consuming animal.

6. The process of claim 1 wherein the phosphate salt is selected from the group consisting of dicalcium phosphate, monocalcium phosphate, and magnesium phosphate.

7. The process of claim 1 wherein the phosphate salt is selected from the group consisting of monocalcium phosphate and dicalcium phosphate.

8. The process of claim 1 wherein the hydrocolloid stabilizer is xanthan gum.

9. The process of claim 1 wherein the hydrocolloid stabilizer is locust beam gum.

10. The process of claim 1 wherein the hydrocolloid stabilizer comprises a mixture of locust bean gum and xanthan gum.

11. The process of claim 1 further comprising the step of heating the admixture prior to drying the admixture to form the feed block.

12. The process of claim 11 wherein the admixture is heated to between about 40° C. and about 70° C.

13. The process of claim 1 wherein the step of drying the admixture includes the steps of providing a mold in which the admixture can air dry and placing the admixture into the drying mold.

14. The process of claim 1 wherein the admixture is dried with ambient air for a period of between about 5 and about 30 days.

15. The process of claim 1 wherein the step of drying the admixture comprises the steps of,
    providing a mold for containing the concentrate,
    placing the admixture into the mold and drying the admixture with ambient air to a point at which the feed block has a water content of less than about 32%.

16. The invention of claim 1 wherein the step of adjusting the pH of the admixture includes the step of adding a base selected from the group consisting of sodium hydroxide and potassium hydroxide to the admixture in an amount calculated to achieve a pH in the feed block of between about 4.0 and 6.0 after the addition of the phosphate salt.

17. The process of claim 1 wherein the pH is adjusted to between about 4.7 and 5.0.

18. The process of claim 1 wherein the whey concentrate is held for between about 12 and 16 hours.

19. A process for preparing a semi-solid feed block for consumption by an animal, the process consisting essentially of the steps of
    concentrating whey which has been held for a time sufficient to partially crystallize lactose in the whey to form a whey admixture having a solids content of at least about 45%, adding sodium chloride to the admixture in an amount sufficient to achieve a sodium chloride level in the feed block of at least about 4%, adding a hydrocolloid stabilizer to the admixture in an amount sufficient to achieve a concentration of between about 0.3 to 1.0 weight percent in the feed block, blending the admixture at a temperature between about 40° C. to 70° C., to cause the whey and hydrocolloid stabilizer to interact to form a gel-like structure, adding at least one of a therapeutic and nutritional feed supplement to the admixture in an amount sufficient to achieve a desired dosage effect in the consuming animal, adding about 10 to about 20 dry weight percent of a salt selected from the group consisting of phosphate salts of calcium and magnesium to strengthen the gel-like structure of the whey admixture, adding a base selected from sodium hydroxide and potassium hydroxide in an amount calculated to achieve a pH in the admixture of between about 4.0 and 6.0, cooling the admixture to a temperature less than about 40° C., placing the admixture into a mold, drying the admixture sufficiently to form a lactose containing feed block wherein the lactose in the feedblock is predominantly nonhydrolyzed lactose, and wherein the water content of the feed block is less than about 32%.

* * * * *

UNITED STATES PATENT AND TRADEMARK OFFICE
CERTIFICATE OF CORRECTION

PATENT NO. : 4,547,386

DATED : October 15, 1985

INVENTOR(S) : James V. Chambers; T. Wayne Perry; Dennis A. Lonergan and Jay S. Marks It is certified that error appears in the above-identified patent and that said Letters Patent is hereby corrected as shown below:

At column 7, line 62, please delete "20%" and insert therefor --2%--; and

At column 8, line 27, please delete "beam" and insert therefor --bean--.

Signed and Sealed this

Fourth Day of February 1986

[SEAL]

Attest:

*Attesting Officer*

DONALD J. QUIGG

*Commissioner of Patents and Trademarks*